Figure 1:
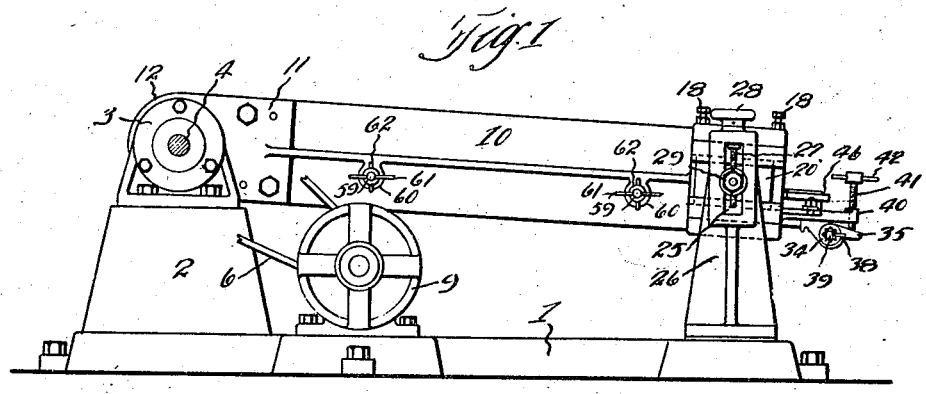

Feb. 8, 1927.  
H. MUELLER  
LAWN  
Filed Feb. 26, 1923   3 Sheets-Sheet 1

1,616,917

Inventor  
Hilmar Mueller  
By Hull, Brook & West  
Attys.

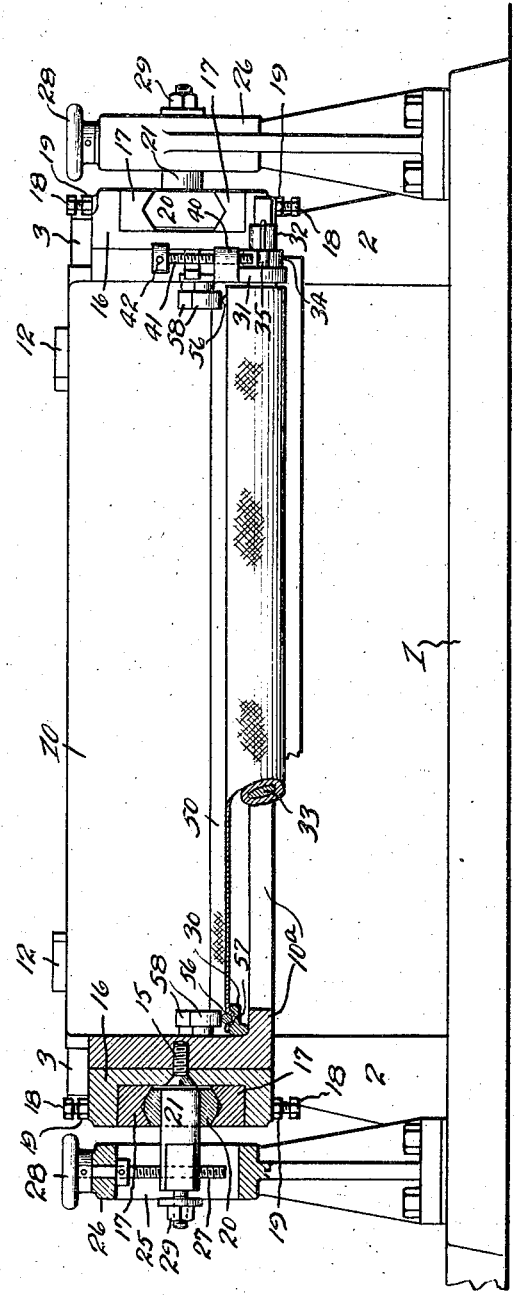

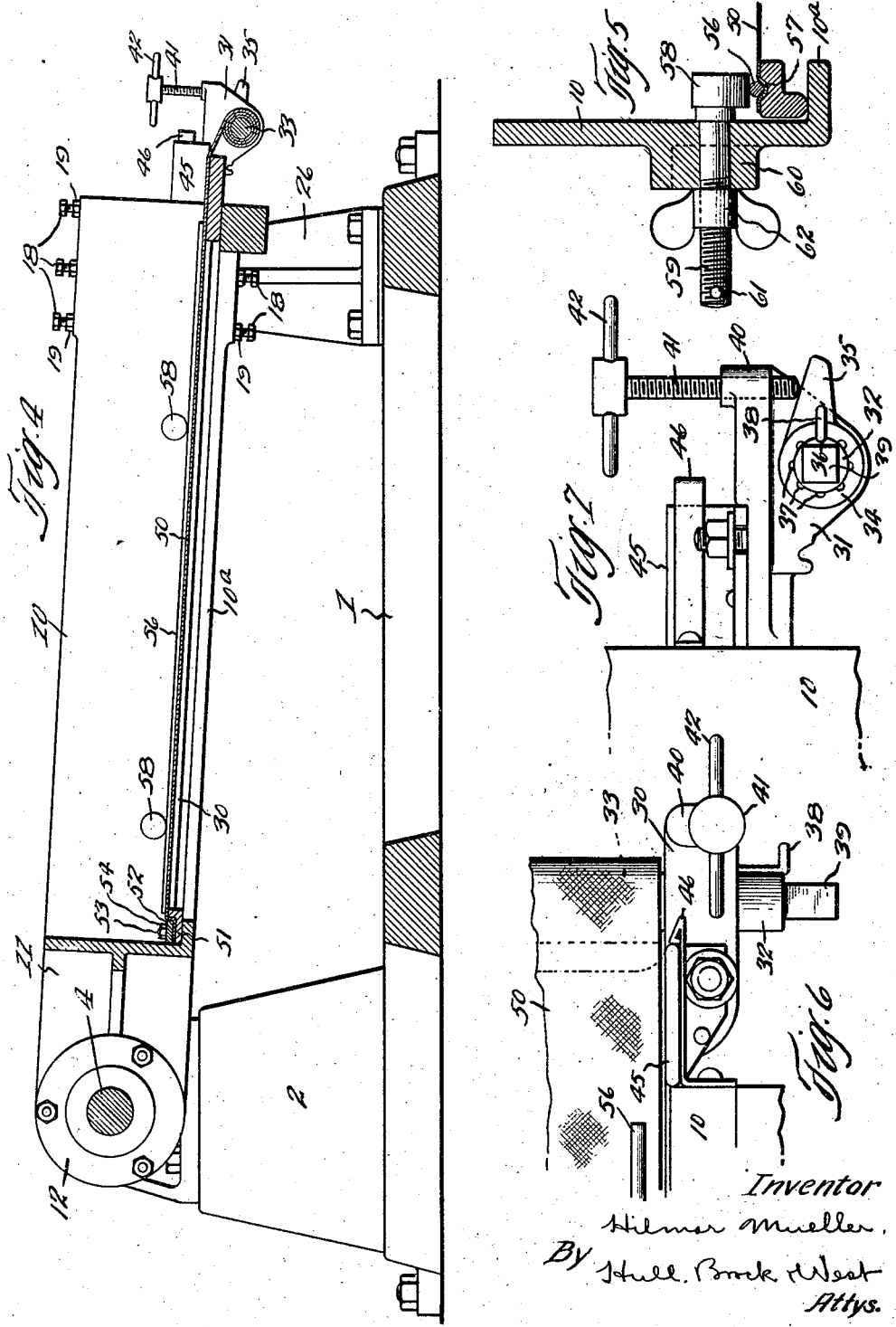

Patented Feb. 8, 1927.

1,616,917

UNITED STATES PATENT OFFICE.

HILMAR MUELLER, OF TRENTON, NEW JERSEY.

LAWN.

Application filed February 26, 1923. Serial No. 621,124.

This invention relates to that class of screening devices which are used for screening dissolved clay from which pottery or earthenware is made, and which devices are known in the ceramic art as lawns.

This dissolved clay—which, in the art, is referred to as " slip ", or " clay slip "—because of its plastic nature, has proven to be quite difficult of satisfactory screening by means of devices hitherto employed for the purpose; and it is the primary object of my invention to provide a screening device of such improved construction and effective action as will cause it to function in a highly efficient manner, expediting and facilitating the screening operation and overcoming the difficulties heretofore encountered.

Further objects of the invention are to provide a device of the aforesaid character which is very substantial and durable and thus able to withstand the hard service and jarring to which it is continually subjected; to provide a screening device or lawn which is very easy of action, and, therefore, requires a minimum amount of power to operate it; and wherein the lawn box and the screen supported thereby have a peculiar rolling motion, so to speak, the box being mounted to have a rotating action in a vertical plane at its receiving end and a reciprocating action at its discharge end, wherefore the rotating action gradually decreases from the receiving to the discharge end of the screen.

A further object is to provide means for conveniently adjusting the pitch or inclination of the lawn box and screen so that the time of travel of the slip from the receiving to the discharge end of the screen may be changed according to the consistency of the clay slip or clay body being treated, and preferably the means being of such nature that the adjustment may be made without suspending the operation of the machine.

A still further object of my invention is to provide a rigid screen frame equipped with a roller whereon a suitable length of lawn cloth or screen may be wound and from which it may be drawn off from time to time to replace worn-out sections; to provide means for clamping the cloth or screen to the frame, certain of said means being preferably employed for clamping the frame in the lawn box; and to provide further means for drawing the lawn cloth or screen " drum tight", so to speak, across the frame, thereby to avoid its responding too freely to the vibratory action of the machine and as a result thereof nullify, to a certain extent, the effect upon the clay slip. A further object is to provide a simple yet very effective latch for holding the frame in position within the lawn box and which permits the screen to be placed within the box and removed therefrom in a particularly convenient manner.

The objects above set forth, with others which will hereinafter appear, are attained in the structure illustrated in the accompanying drawings and set out in the claims appended hereto.

Figure 2:
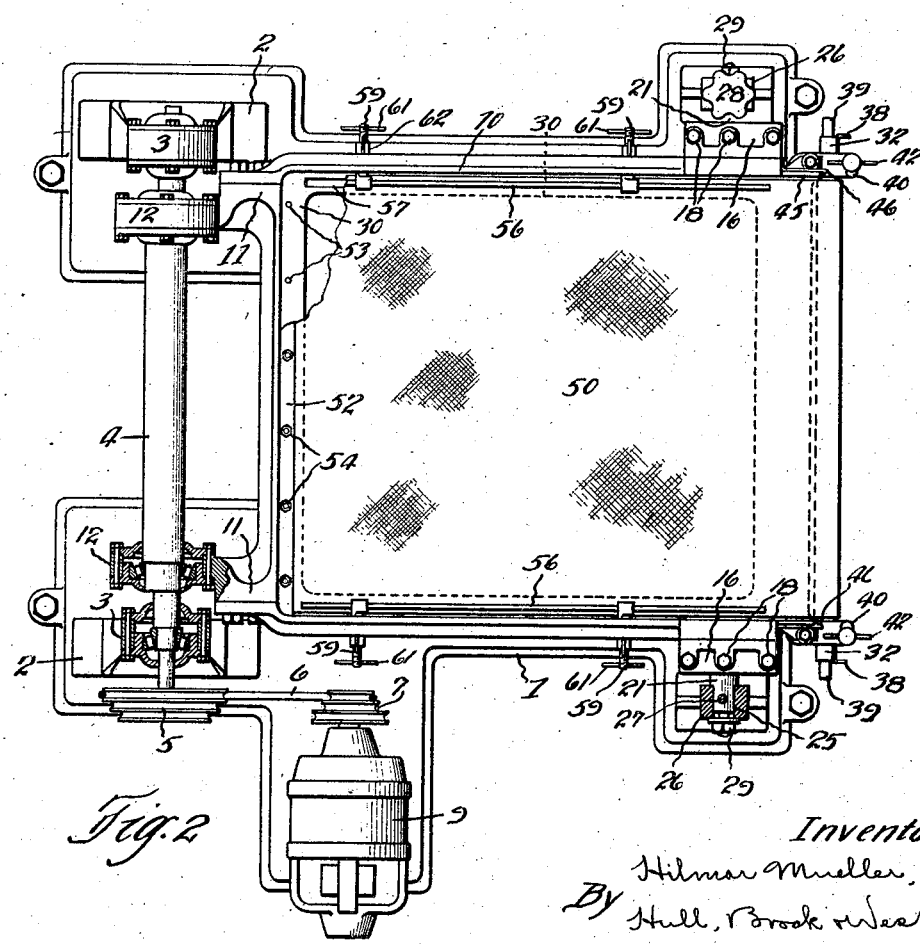

In the drawings, Fig. 1 is a side elevation of my improved lawn; Fig. 2 is a plan view thereof; Fig. 3 shows the discharge end of the lawn on a scale somewhat enlarged over that of the preceding views; Fig. 4 is a longitudinal section through the lawn on the same scale as Fig. 3; Fig. 5 is a sectional detail through the side of the box and screen frame, showing means for clamping the side edges of the screen cloth to the frame, and the frame within the box; and Figs. 6 and 7 are details of the latch for holding the frame in proper position within the lawn box.

The base of the machine is designated 1 and rising from one end thereof are stands 2 which support bearings 3 within which the ends of the drive shaft 4 are journaled, suitable anti-friction bearings being employed to insure easy rotation of the shaft. A cone pulley 5 is secured to one end of the shaft, and driving connection is effected through a belt 6 between the pulley 5 and a similar but smaller pulley 7 that is secured to the end of the shaft of a motor 9 which is mounted upon a lateral extension of the base 1. The speed of the shaft 4 may be varied by shifting the belt 6 to different sections of the pulleys 5 and 7. It is obvious that as a substitute for this means of changing the speed of shaft 4, a variable speed motor may be employed that has driving connection with the shaft 4 through gears or pulleys of fixed ratio.

The lawn box is designated 10 and to extensions 11 of what may be referred to as its receiving end are secured bearings 12 which embrace portions of the shaft 4 which are eccentric with respect to its journaled end portions. Suitable anti-friction bearings are also employed in this instance to insure ease of operation. It is clear from the construction already described that when the shaft 4 is rotated, a rolling motion is imparted to the adjacent end of the box 10.

To the sides of the opposite, or discharge, end of the box are secured, as by screws 15, channel members 16 which open outwardly. Within the tops and bottoms of the channel members are supported shoes 17 which are held in place as by means of screws 18, shown as having lock nuts 19 applied thereto. The opposed faces of the shoes 17 are grooved for the reception of the complementary formed sides of blocks 20 which are supported for oscillation upon studs 21. The outer ends of the studs 21 enter slots 25 in standards 26 which rise from the base 1. Screws 27 are journaled in the tops of the standards 26 and extend axially of the slots 25, the screws being threaded through the studs 21. Consequently by rotating the screws 27, as by means of the hand wheels 28 that are applied to their upper ends, the studs with the blocks 20 may be adjusted vertically to correspondingly adjust the adjacent end of the lawn box and alter the pitch or inclination of the screen that is supported within the box, as I shall presently explain. Nuts 29 are applied to the reduced threaded ends of the studs 21 and serve as means for clamping the studs in any adjusted position within the standards to insure against accidental disarrangement of the studs, due to vibration. The clamping of the studs 21 to the standards 26 by means of the nuts 29 is made possible by the fact that the nuts 29 are flattened on their opposite sides where they enter the slots 25, as shown in Fig. 1, thus forming shoulders which engage the inner sides of the standards.

The screen frame, designated 30, fits within the box 10 and rests upon the flange 10$^a$ thereof. The discharge end of the frame overhangs the corresponding end of the box and is provided at its opposite sides with brackets 31 within which the trunnions 32 of a roller 33 are journaled, the roller being supported a suitable distance below the plane of the top surface of the frame. Applied to the ends of the trunnions 32 beyond the brackets 31 are the hub portions 34 of fingers 35. Each trunnion 32 is provided with a spline or keyway 36, and the inner face of each of the hubs 34 is formed with a series of similar keyways or notches 37, any one of which, when brought into register with the keyway or spline 36 of the trunnion is adapted to receive therewithin the shank of a key 38. Thus, the fingers 35 are adapted to be locked to the trunnions of the roller in various annular positions with respect thereto. One or both of the trunnions 32 may be provided with an extension 39 squared or otherwise formed for the application of a crank or other suitable instrument for turning the roller. Threaded through bosses 40 of the frame, immediately above the fingers 35, are screws 41 having operating handles 42, the lower ends of the screws being arranged to bear upon the fingers. Lugs 45 which rise from the opposite sides of the discharge end of the screen frame are adapted to be embraced by spring fingers or latches 46 which extend endwise from the sides of the lawn box, the spring fingers or latches 46 being so formed that they will automatically override the lugs 45 when the screen frame is slid endwise into the box and when the frame is in final position slip over the outer edges of the lugs. This provides a very simple, convenient and effective means of retaining the frame in its proper position within the box. Additional means are employed to assist in holding the frame in place, as will be seen presently.

A supply of lawn cloth or screen 50, several times the length of the frame 30, is wound upon the roller 33 and from the roller may be drawn across the upper surface of the frame, the keys 36 being removed to permit the roller to rotate independently of the fingers 35. The free end of the screen is clamped within a rabbeted portion 51 of the receiving end of the frame by a strip 52 that is engaged over studs 53 which rise from the frame and is held in place by nuts 54 that are applied to said studs. With the free end of the screen securely anchored in this wise, the roller 33 is rotated, as by means of a crank or the like applied to the extension 39, to draw the screen as tight as practicable, the roller being adjusted to bring into register the keyways or splines of the trunnions 32 with suitable ones of the keyways or notches 37 of the fingers 35 whereupon the keys 36 are inserted into the registering keyways so as to lock the fingers to the trunnions. Now, by turning downwardly on the screws 41, the screen may be drawn very tight across the frame; and should it require a greater movement than that afforded by a complete downward movement of the screws 41, one of the screws may be retracted while the other holds the parts under tension and the corresponding finger 35 readjusted with respect to the roller, so that by a subsequent turning down of the screw, the roller is rotated still further to impose a greater tension upon the screen. Thus, the screws 41 on the opposite sides of the frame may be manipulated alternately until the desired tension of the screen is accomplished. After the screen cloth has been thus stretched longitudinally of the frame, rods 56 are laid along the side members of the frame upon the edges of the screen cloth and above grooves 57 in the said side members, and these rods are then forced into the groove to effectively clamp the side edges of the screen cloth, as illustrated in Fig. 5, by eccentrics 58 having threaded shanks 59 that are extended through hollow bosses 60 of the sides of the lawn box, the shanks 59 being provided with operating handles 61 at their outer ends so that they may be turned to press the eccentrics 58 downwardly with considerable force. Wing-nuts 62 are applied to the shanks 59 and serve to lock the eccentrics in depressed condition by drawing the eccentrics into clamping engagement with the sides of the box.

The lawn may be equipped with the usual box or hopper which supplies the dissolved clay or slip to the receiving end of the screen, and with the customary chute located at the discharge end of the screen to receive the tailings or refuse. A suitable trough may be positioned beneath the lawn box to catch the material screened and conduct it to some desired point. These accessories are well-known to those familiar with the art and it is deemed advisable for the sake of clearness to omit them from the drawing.

Preferably the lawn box, screen frame, and all parts with which the wet clay slip may come in contact are made of aluminum or other suitable material which affords the desired rigidity and strength and is immune from rust, as rust in the clay slip is very objectionable.

From the foregoing description, the mode of operation and the character of the motion imparted to the screen, with its advantageous results, will be readily understood.

Having thus described my invention, what I claim is:

1. A lawn comprising, in combination, a screen, actuating mechanism supporting one end of the screen and imparting to it a rotary motion in a vertical plane, guides carried by the opposite end of the screen and disposed longitudinally with respect thereto, blocks slidable within said guides, members supporting said blocks for oscillation, standards sustaining said members, and means for adjusting said members vertically of the standards.

2. A lawn comprising, in combination, a base from one end of which stands rise, said stands being spaced apart transversely of the base, bearings mounted upon said stands, a shaft having its ends journaled within said bearings, the shaft having an eccentric portion between the bearings, means for rotating the shaft, a lawn box having bearings secured to one of its ends, said bearings embracing the eccentric portion of the shaft, standards mounted upon the end of the base opposite the aforesaid stands, means vertically adjustable within said standards from which the adjacent end of the lawn box is slidably supported, and a screen frame fitted within the lawn box.

3. In a lawn, in combination with a rigid lawn box, a screen frame removably fitted therein, means on the sides of the box for holding the frame against vertical movement with respect to the box, the frame having lugs on its opposite sides, and spring latches carried by the opposite sides of the box and arranged to engage over said lugs when the screen frame is inserted into the box thereby to hold the frame against longitudinal movement with respect to the box.

4. In a lawn, in combination with a lawn box having a frame supporting ledge, a screen frame removably fitted within said box and resting upon said ledge, locking elements having eccentric heads arranged to engage the frame, and threaded shanks projected through apertures in the side walls of the box, means for turning said locking elements to cause their eccentric heads to press the frame against the ledge of the box, and locking nuts applied to the threaded shanks for binding the locking elements in locking condition.

5. In combination, a screen frame of the character set forth, a roller supported adjacent one end of the frame, the roller being adapted to carry a supply of lawn cloth and from which the cloth may be drawn across the frame, means for clamping the free end of the cloth to the opposite end of the frame, means for rotating the roller to remove the slack from the cloth, and additional means for further rotating the roller to stretch the cloth to the desired degree of tightness and for maintaining the roller in a position to maintain the cloth in such condition.

6. In combination, a screen frame of the character set forth, having brackets projecting from the opposite sides of one of its ends, a roller having trunnions journaled within said brackets, said roller being adapted to carry a supply of lawn cloth and from which the cloth may be drawn across the frame, means for clamping the free end of the cloth to the opposite end of the frame, means for rotating the roller to remove the slack from the cloth, arms secured to the trunnions of the roller, and screws threaded through parts of the frame for engagement with said fingers thereby to further rotate the roller and impart the desired degree of tightness to the cloth.

7. In combination, a screen frame of the character set forth from the opposite sides of one end of which brackets extend, a roller having trunnions journaled within said brackets, said roller being adapted to carry a supply of lawn cloth and from which the cloth may be drawn across the frame, means for clamping the free end of the cloth to the opposite end of the frame, means for rotating the roller to remove the slack from the cloth, fingers having hub portions applied to the trunnions of the roller, means for locking said hubs to the trunnions in various angular positions with respect thereto, and screws threaded through parts of the frame for cooperation with said fingers for further rotating the roller and imparting to the lawn cloth the desired degree of tightness.

8. In combination, a screen frame of the character set forth having brackets extending from the opposite sides of one of its ends, a roller having trunnions journaled within said brackets, said roller being adapted to carry a supply of lawn cloth and from which the cloth may be drawn across the frame, the opposite end of the frame being rabbeted, a bar fitting within said rabbeted portion of the frame, the free end of the lawn cloth being adapted to be engaged within said rabbeted portion between it and said bar, means for drawing the bar firmly within said rabbeted portion thereby to securely clamp the free end of the lawn cloth to the frame, and means for rotating the roller to draw the cloth to the desired degree of tightness across the frame and for holding the roller in a position to maintain the cloth in such condition.

9. In combination, a screen frame of the character set forth having brackets extending from opposite sides of one of its ends, a roller having trunnions journaled within said brackets, the roller being adapted to carry a supply of lawn cloth and from which the cloth may be drawn across the frame, means for clamping the free end of the cloth to the opposite end of the frame, fingers having hub portions applied to the trunnions of the roller, the roller and hub portions of the fingers having keyways adapted to be brought into register when the fingers occupy different angular positions with respect to the trunnions, a key for insertion within registering keyways thereby to lock the fingers to the trunnions, and screws threaded through parts of the trunnions for cooperation with said fingers.

In testimony whereof, I hereunto affix my signature.

HILMAR MUELLER.